1,344,542.
J. H. LANE.
WRENCH.
APPLICATION FILED APR. 28, 1919.
Patented June 22, 1920.
Fig. 1
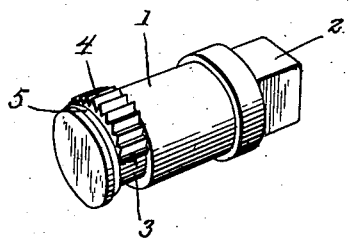
Fig. 2
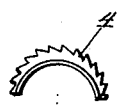
Fig. 3
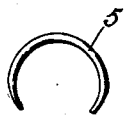
Fig. 4
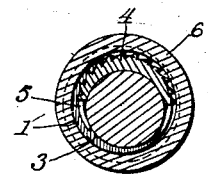
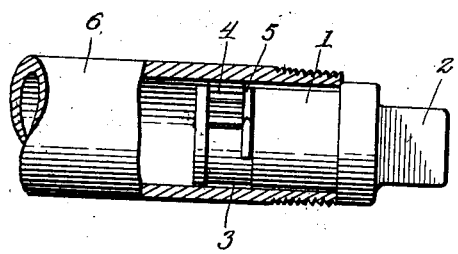
Fig. 5
Witnesses
Geo. E. Logan
Inventor
J. H. Lane
By Victor J. Evans
Attorney

UNITED STATES PATENT OFFICE.

JAMES H. LANE, OF MARSHALLTOWN, IOWA.

WRENCH.

1,344,542.   Specification of Letters Patent.   Patented June 22, 1920.

Application filed April 28, 1919. Serial No. 293,064.

*To all whom it may concern:*

Be it known that I, JAMES H. LANE, a citizen of the United States, residing at Marshalltown, in the county of Marshall and State of Iowa, have invented new and useful Improvements in Wrenches, of which the following is a specification.

This invention relates to means for extracting broken pipes and bolts from parts containing them and the principal object of the invention is to provide means for removing the parts without damaging the threads of the bore.

Another object of the invention is to provide a toothed part with cam means for forcing the same against the interior wall of the pipe to be removed so that the extractor will be locked to the pipe to permit the withdrawal of the pipe.

Still another object of the invention is to provide means whereby the toothed part may be reversed to permit the device to be used in extracting pipes provided with the left and right hand threads.

The invention also consists in certain other features of construction and in the combination and arrangement of the several parts, to be hereinafter fully described, illustrated in the accompanying drawings and specifically pointed out in the appended claim.

In describing my invention in detail, reference will be had to the accompanying drawings wherein like characters denote like or corresponding parts throughout the several views, and in which:—

Figure 1 is a perspective view of the device;

Fig. 2 is a perspective view of the dog;

Fig. 3 is a perspective view of the spring;

Fig. 4 is a cross section showing the device in place in a pipe.

Fig. 5 is a view partly in section showing the device in use.

In these views the device is shown as consisting of a cylindrical body 1 and a head 2 which is of square shape in cross section and is adapted to receive a wrench so that the device may be rotated. Adjacent the end of the cylindrical body is formed an annular groove 3, the bottom of which is eccentrically arranged. This groove receives the toothed dog 4 which is of crescent shape, as shown, with the teeth on the convex side. The dog is removably held in the groove by the curved spring 5, said spring holding the dog in the groove by friction.

It will be seen that when the device is placed in a pipe, such as that shown at 6, and the dog moved in the groove until its teeth engage the said pipe, upon rotation of the device the dog will set up a wedge action between the device and the pipe, so that the pipe will turn with the device. If the pipe is provided with a left hand screw thread the dog is reversed so that the teeth will point in an opposite direction so that the pipe may be turned in the proper direction to remove the same.

The device is designed for removing broken pipes from drums and the like where the pipe is entirely inclosed and cannot be seized by the usual form of pipe wrench. The device may also be used for removing bolts which have become broken. In this case a hole is bored in the bolt and then the device is placed in this hole.

It will, of course, be understood that the invention will be made in different sizes to be used on different sizes of pipes and bolts.

It is thought from the foregoing description that the advantages and novel features of my invention will be readily apparent.

I desire it to be understood that I may make changes in the construction and in the combination and arrangement of the several parts, provided that such changes fall within the scope of the appended claim.

What I claim is:—

A wrench of the class described comprising a member having a cylindrical part provided with an annular groove having its bottom eccentrically arranged, a toothed dog in said groove and a split spring ring for removably holding said dog in said groove.

In testimony whereof I affix my signature.

JAMES H. LANE.